2,751,055
DOUBLE CLUTCHES

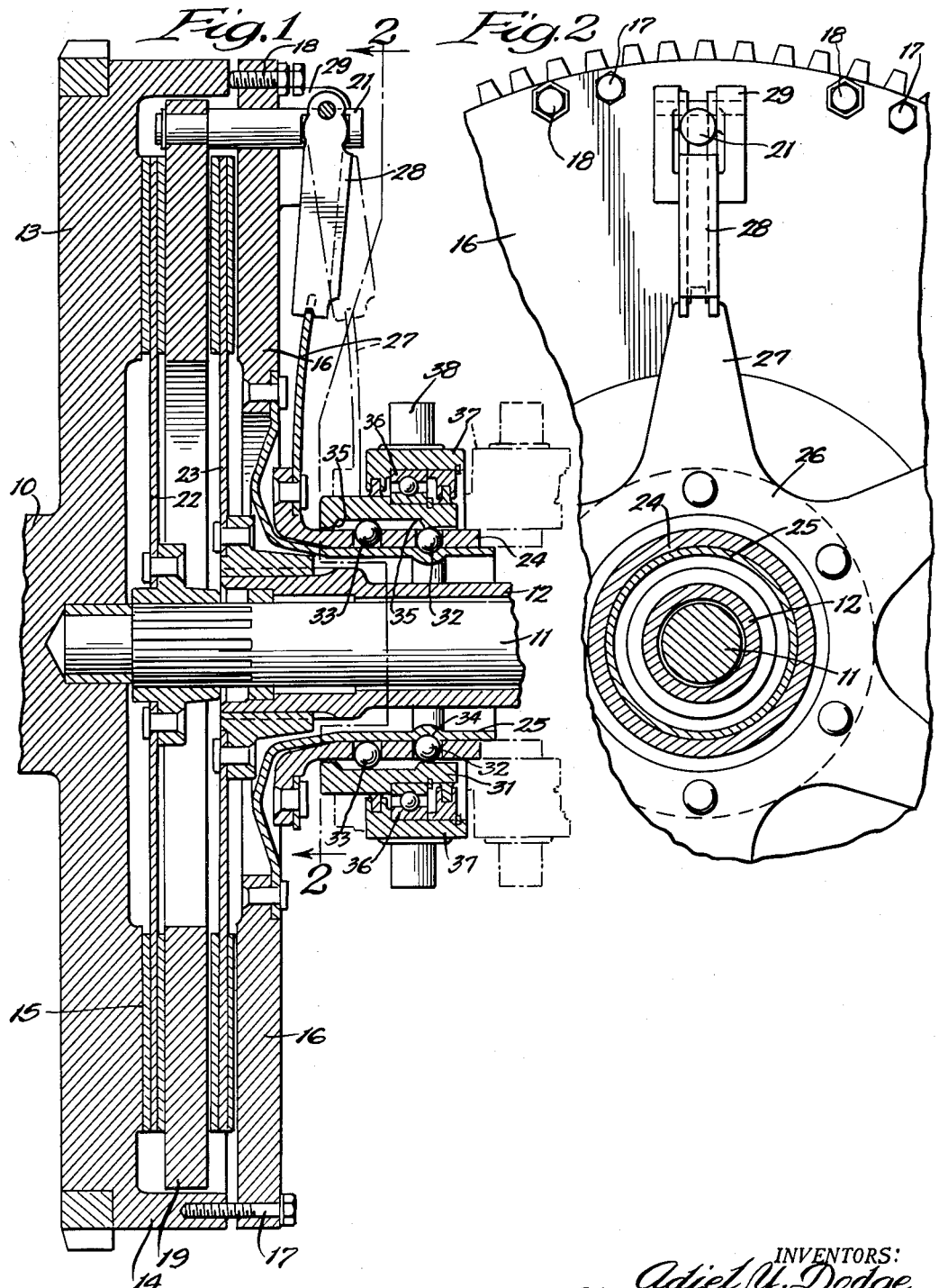

Adiel Y. Dodge and William A. Robertson, Rockford, Ill.

Application March 23, 1951, Serial No. 217,264

8 Claims. (Cl. 192—48)

This invention relates to double clutches and more particularly to a clutch construction in which either of two members may be connected selectively to a third member. In most usages, the third member will be a driving member which is connected selectively to either of two driven members, although in some instances a single driven member may be connected selectively to different driving members.

In many types of power transmitting mechanisms it is desirable to connect either of two members selectively to a third member to produce different driving conditions. It is desirable to use a double clutch for this purpose instead of separate clutches to reduce cost and space requirements. The present invention relates primarily to improvements in clutches of this type, although some features of the invention may be used advantageously in single clutches or other types of clutches.

It is one of the objects of the present invention to provide a double clutch in which either of a pair of clutch couples can be be applied through a single actuating spring. According to one feature of the invention, a disc type spring is employed having laterally flexible fingers through which the clutch pressure plate is moved in either direction.

Another object is to provide a clutch in which the load on the thrust bearing is relieved when the clutch is moved to engaged position.

For this purpose, according to another feature of the invention, locking means are provided which lock the shift collar of the clutch in engaging position after it has been shifted thereto so that the load on the thrust bearing is entirely or almost entirely relieved.

The above and other objects and features of the invention will be more readily apparent from the following description when read in connection with the accompanying drawings, in which:

Figure 1 is an axial section through a clutch embodying the invention; and

Figure 2 is a partial section on the line 2—2 of Figure 1.

The clutch, as illustrated, is adapted to connect one member shown as a shaft 10 to either of two members shown as a shaft 11 and a tubular shaft 12 coaxial with the shaft 11. For purposes of description, it will be assumed that the shaft 10 is the driving shaft and that the shafts 11 and 12 are driven shafts, although this arrangement could be reversed if desired.

The shaft 10 carries a radially extending flange 13 which is illustrated as a fly-wheel and which terminates at its periphery in an axially extending flange 14. The inner surface of the flange 13 may be thickened and finished as indicated at 15 to form an annular friction surface, so that the face of the fly-wheel 13 functions as a clutch plate. A second annular clutch plate 16 is secured to the flange 14 to lie in spaced relation to the surface 15. The plate 16 is preferably adjustably connected to the fly-wheel so that the clutch clearance can be adjusted. As indicated a series of screws 17 extend through the periphery of the plate 16 into the flange 14 and adjustable spacers 18 are provided adjacent to the screws. In this way the plate 16 can be rigidly secured to the fly-wheel and the space between them can be adjusted for the desired clearance.

Between the two clutch plates, there is mounted an annular pressure plate 19 which is supported on pins 21 extending axially through the plate 16. With this construction, the pressure plate 19 turns with the clutch plates 13 and 16, but can be moved axially relative thereto. A pair of clutch discs 22 and 23 are provided connected respectively to the shafts 11 and 12 and preferably splined thereto for slight axial movement thereon. The disc 22 lies between the fly-wheel 13 and the pressure plate 19, while the disc 23 lies between the plate 16 and the pressure plate 19. When the pressure plate is moved to the left, as shown in Figure 1, the disc 22 will be gripped between the pressure plate and the fly-wheel to connect the shafts 10 and 11. When the pressure plate is moved to the right, the disc 23 will be gripped between the pressure plate and the plate 16 to connect the shafts 10 and 12.

For shifting the pressure plate, a shift collar 24 is provided which is axially shiftable on a tubular hub 25 rigidly secured to the plate 16. The shift collar 24 carries an annular spring disc 26 which is formed with a series of outwardly extending spring fingers 27. The outer end of each finger 27 fits into a slot formed in the inner end of a lever 28 which is pivoted at its outer end on a bracket 29 on the clutch plate 16 and which engages one of the pins 21. When the collar 24 is shifted in one direction or the other, the levers 28 will be swung through the spring fingers 27 to move the pressure plate. The spring fingers can deflect laterally in either direction to provide a resilient pressure on the pressure plate without providing a rigid mechanical stop for the shift collar 24 so that the desired clutching pressure in either direction is obtained through a single spring device.

For moving the shift collar 24, a shift ring 31 is mounted thereon for axial sliding movement. The shift collar is formed with two axially spaced sets of openings therethrough into which coupling members shown as sets of balls 32 and 33 slidably fit. A single annular groove 34 is formed in the hub 25 into which one set or the other of the balls may be moved to lock the shift collar against movement on the hub when the clutch is in either of its engaged positions.

To connect the shift ring and shift collar, and to control the locking members, the inner surface of the ring is formed with a relatively wide groove terminating at its ends in tapered cam surfaces 35. Beyond the cam surfaces 35 the inner face of the ring is formed with surfaces which are substantially cylindrical and upon which the locking members will bear when the collar is moved completely to clutch engaging position. If desired, the outer surfaces on the collar may be formed with a very slight angle or may even be slightly grooved at the points where they engage the balls. The shift ring is moved through an annular thrust bearing 36 which is supported in an annular ring 37 connected through pins 38 or the like to a shifting yoke or other desired type of shifting mechanism. The thrust bearing is locked against axial movement relative to both the shift ring 31 and the yoke ring 37 so that the shift ring will be moved whenever the yoke ring is moved.

When the clutch is in its disengaged position, the shift ring 31 will be centered relative to the shift collar 24 and both sets of locking balls 32 and 33 will engage the cylindrical portion of the hub 25 and will extend into the groove in the shift ring. When the shift ring is moved to the left to the position shown in Figure 1 the locking balls 32 will be cammed into the groove 34 by the adjacent cam surface 35 and the shift ring will be enabled to move slightly further to the left than the shift collar to bring the internal cylindrical or grooved end surface thereof into registry with the balls 32. At this time, the clutch plate 22 will be gripped to connect the shafts 10 and 11. Due to the fact that the locking balls 32 are engaged in the groove 34 and still remain in the openings in the shift collar 24, the shift collar will be held or locked against axial movement on the hub. It is to be noted that the forces on the shift ring required to hold the parts in this position can be zero or very close to zero force depending upon the angle of the end cam surfaces on the ring which engage the balls 34. If these surfaces are truly cylindrical, no force on the ring is required, whereas if the surfaces are slightly grooved or notched, the pressure on the balls themselves will tend to hold the parts in locked position, so that no holding force on the ring is required. Thus all axial load on the thrust bearing 36 is removed so that the only time a load is imposed on this bearing is during axial shifting. Wear on the bearing is thus minimized and the life of the shift mechanism is greatly extended.

To disengage the shift ring is moved back to the right to allow the clutch members 32 to be cammed upward by the grooves 34 into the groove in the shift ring. It will be noted that during this movement, the locking balls 33 serve to connect the shift ring and shift collar so that the shift collar will be moved positively by the ring. Continued movement to the right will engage the clutch plate 23 to connect the shafts 10 and 12. At this time, the locking balls 33 will be cammed into the groove 34 to lock the clutch in its engaged position and to relieve all of the load on the thrust bearing in the manner pointed out above. In all cases, the shift ring and collar can be moved to their fully locked position due to the resilient connection provided by the spring fingers 27.

While one embodiment of the invention has been shown and described in detail, it will be understood that this is illustrative only and is not to be taken as a definition of the scope of the invention, reference being had for this purpose to the appended claims.

What is claimed is:

1. A double clutch comprising a clutch plate, a second clutch plate secured in spaced relation to the first named clutch plate, an elongated hub coaxial with the clutch plates, a pressure plate mounted between the clutch plates for axial shifting in either direction, discs between the pressure plate and the clutch plates respectively, an axially movable shift collar on the hub, locking means to lock the shift collar selectively in a position adjacent to the clutch plates or in a second position remote from the clutch plates, a spring disc secured to the shift collar and having a plurality of outwardly extending spring fingers, and means connecting the spring fingers to the pressure plate yieldingly to urge it toward one clutch plate or the other as the collar is shifted in one direction or the other.

2. A double clutch comprising a clutch plate, a second clutch plate secured in spaced relation to the first named clutch plate, an elongated hub coaxial with the clutch plates, a pressure plate mounted between the clutch plates for axial shifting in either direction, discs between the pressure plate and the clutch plates respectively, an axially movable shift collar on the hub, locking means to lock the shift collar selectively in a position adjacent to the clutch plates or in a second position remote from the clutch plates, levers pivoted on one of the clutch plates and extending radially inward toward the shift collar, pins connecting the levers to the pressure plate and extending slidably through said one of the clutch plates, and a flat spring disc secured to the shift collar and formed with radially projecting spring fingers connected at their outer ends to the inner ends of the levers.

3. A double clutch comprising a pair of clutch plates secured together in axially spaced relation, a pressure plate mounted between the clutch plates for axial shifting in either direction, clutch discs between the pressure plate and the clutch plates respectively, an elongated hub carried by the clutch plates, a shift collar slidable axially on the hub, means including a laterally flexible spring connecting the shift collar to the pressure plate to move it, a shift ring slidable on the shift collar to move it axially, and locking means operated by movement of the shift ring on the shift collar after the shift collar has been moved to clutch engaging position to lock the shift collar against movement on the hub.

4. A double clutch comprising a pair of clutch plates secured together in axially spaced relation, a pressure plate mounted between the clutch plates for axial shifting in either direction, clutch discs between the pressure plate and the clutch plates respectively, an elongated hub carried by the clutch plates, a shift collar slidable axially on the hub, a flat disc spring secured to the shift collar and formed with radially extending flexible fingers, levers connecting the fingers to the pressure plate to move it as the collar is moved, a shift ring slidable on the shift collar, and locking means operated by movement of the shift ring on the shift collar after the shift collar has been moved to clutch engaging position to lock the collar against movement on the hub.

5. A double clutch comprising a pair of clutch plates secured together in axially spaced relation, a pressure plate mounted between the clutch plates for axial shifting in either direction, clutch discs between the pressure plate and the clutch plates respectively, an elongated hub carried by the clutch plates, a shift collar slidable axially on the hub, a flat disc spring secured to the shift collar and formed with radially extending flexible fingers, levers connecting the fingers to the pressure plate to move it as the collar is moved, the collar being formed with spaced sets of openings therethrough, coupling members slidable in the openings, the hub having recesses therein to receive the coupling members in one set of openings when the collar is shifted in one direction and the coupling members in the other set of openings when the collar is shifted in the other direction, a shift ring slidable on the collar and formed with internal cam surfaces to cam the coupling members respectively into the recesses when the ring is moved in opposite directions, and a thrust bearing connected to the ring to move it.

6. A clutch comprising a pair of clutch elements movable axially relative to each other in one direction to engage the clutch and in the other direction to disengage the clutch, a hub secured against axial movement relative to one of the clutch elements, a shift collar axially slidable on the hub, means including a laterally flexible spring connecting the shift collar to the other of the clutch elements, a shift ring slidable on the shift collar to move the shift collar axially, and locking means operated by axial movement of the shift ring on the shift collar after the shift collar has been moved to clutch engaging position to lock the shift collar against movement on the hub.

7. A clutch comprising a pair of clutch elements movable axially relative to each other in one direction to engage the clutch and in the other direction to disengage the clutch, a hub secured against axial movement relative to one of the clutch elements, a shift collar axially slidable on the hub, a spring disc secured to the collar and having a spring finger projecting outward therefrom, a lever connecting the spring finger to the other of the clutch elements, the collar having an opening therein, a locking member slidable in the opening, the hub having a recess therein to receive the locking member when the collar is moved to clutch engaging position, and a shift ring slidable on the collar and formed with an internal cam recess to receive the locking member and to urge it inward into the recess when the shift ring is moved axially in a direction to engage the clutch.

8. Operating mechanism for a friction clutch including a hub and an operating plate movable axially of the hub to clutch engaging and disengaging positions, comprising a shift collar shiftable axially on the hub; a spring disc secured to the collar and extending radially outward therefrom, mechanism connecting the outer part of the spring disc to the operating plate to move it axially as the collar is shifted axially, the collar having openings therein, coupling members movable radially in the openings, the hub having recesses therein to receive the coupling members when the collar is shifted to a position to engage the clutch, and a shift ring slidable on the collar and formed with an internal cam recess to receive the coupling members and terminating in an internal cam surface to cam the coupling members into the recesses in the hub.

References Cited in the file of this patent

UNITED STATES PATENTS

| | | |
|---|---|---|
| 1,379,891 | Aichele | May 31, 1924 |
| 2,062,195 | Smith | Nov. 24, 1936 |
| 2,077,663 | Batten | Apr. 20, 1937 |
| 2,354,621 | Spase | July 25, 1944 |
| 2,380,677 | Schjolin | July 31, 1945 |
| 2,399,886 | Odevseff | May 7, 1946 |
| 2,413,675 | Baker | Jan. 7, 1947 |
| 2,459,361 | Carnagua et al. | Jan. 18, 1949 |
| 2,603,327 | King | July 15, 1952 |
| 2,700,444 | Ahlen | Jan. 25, 1955 |

FOREIGN PATENTS

| | | |
|---|---|---|
| 86,613 | Switzerland | Sept. 16, 1920 |
| 838,094 | Germany | May 5, 1952 |